United States Patent [19]
Joyce et al.

[11] 3,872,728
[45] Mar. 25, 1975

[54] ELECTRONIC TEMPERATURE MEASURING INSTRUMENT

[76] Inventors: Michael F. Joyce; George M. Balmes, both of 1321 Birchwood Ave., Chicago, Ill. 60626

[22] Filed: Oct. 10, 1972

[21] Appl. No.: 296,076

[52] U.S. Cl. ....... 73/362 AR, 235/92 MT, 328/132, 331/66
[51] Int. Cl. ............................................. G01k 7/20
[58] Field of Search .................. 73/362 R, 362 AR; 235/92 MT, 151.3; 328/114, 132; 331/66

[56] References Cited
UNITED STATES PATENTS

| | | | |
|---|---|---|---|
| 3,217,144 | 11/1965 | Hinnah | 235/92 MT |
| 3,274,832 | 9/1966 | Hamilton | 73/339 R |
| 3,361,979 | 1/1968 | Luttik et al. | 328/132 X |
| 3,377,862 | 4/1968 | Gheorghiu | 73/362 AR |
| 3,555,448 | 1/1971 | Clarke et al. | 73/362 AR UX |
| 3,603,150 | 9/1971 | Kurtin | 73/362 SC |
| 3,702,076 | 11/1972 | Georgi | 73/362 AR |
| 3,729,998 | 5/1973 | Mueller et al. | 73/362 AR |
| 3,731,072 | 5/1973 | Johnston | 235/151.3 |
| 3,785,207 | 1/1974 | Brzezinski | 73/362 AR |
| 3,805,170 | 4/1974 | Dusheck | 328/132 X |
| 3,817,105 | 6/1974 | Luhowy | 73/362 AR |

FOREIGN PATENTS OR APPLICATIONS

| | | | |
|---|---|---|---|
| 1,176,907 | 1/1970 | United Kingdom | 73/17 R |

*Primary Examiner*—Richard C. Queisser
*Assistant Examiner*—Frederick Shoon

[57] ABSTRACT

A clinical thermometer which includes a temperature detecting probe for insertion into the body of the patient, and a display unit for indicating the temperature being measured, preferably housed in a single, self-contained, battery-powered unit. The unit includes novel circuitry whereby calibration and readiness for use may be indicated, and whereby the temperature may be displayed only upon achievement of the maximum temperature detected in the patient, whereupon such maximum reading will remain on display until intentionally removed. In its battery-powered form, complete portability of the unit can be achieved and a great number of determinations can be made without sacrifice of accuracy before battery replacement is indicated. To accomplish the foregoing purposes, a nematic or liquid crystal display is used for minimum current consumption and high resistance circuit components are carefully selected for this purpose. A rate of temperature increase or differentiator circuit is provided and a feedback circuit is provided to insure that power supply voltage variations do not affect the accuracy of temperature determinations. Preferably, an oscillator having a frequency determined by the temperature of the patient emits pulses at a rate proportional to the temperature, the number of these pulses occurring during elapse of an accurately predetermined, constant time is counted, and the number of pulses occurring in this time is digitally displayed as the temperature. The unit also preferably includes a novel dispenser containing a number of novel probe sheaths which are made by a method described herein.

15 Claims, 8 Drawing Figures

FIG-7

ELECTRONIC TEMPERATURE MEASURING INSTRUMENT

The present invention relates generally to precision measuring instruments, and more particularly, to clinical thermometers intended for use in hospitals, clinics, or other environments, and which are adapted to provide clear and unambiguous readings of the temperatures of patients or subjects whose temperatures are to be taken.

As will be pointed out in greater detail elsewhere herein, the temperature of a patient is one of the most important of the vital signs, and it is of great importance that a temperature measuring instrument be capable of providing an accurate reading, and particularly, that, in view of the importance of the temperature being measured, the instrument be easy to manipulate and be characterized by the absence of adjustments or the like which might mistakenly be made and which might cause improper or inaccurate readings to be taken. Likewise, it is preferred for accurate temperature determinations that the instrument, in use, includes an operational mode which will provide a reading of the maximum temperature sensed, and will continue to display this reading until intentionally caused to return to another or non-indicating state, whereby the display in this mode will be a temperature which is indicative of the patient's maximum temperature rather than only the most recent or other lower temperature sensed by the probe.

Preferably, an instrument according to the invention includes a unitary housing in which are contained a power supply, a temperature display, and electronic circuitry adapted to cause a display indication to be given in response to a temperature detected by a temperature-sensing probe removably received for storage within the housing to which the probe is connected by a flexible cord.

It has long been recognized that determining the temperature of human patients in hospitals and clinical environments may be an unnecessarily time-consuming task when carried out with conventional mercury-in-glass thermometers. For example, in the use of these thermometers, because of the low thermal conductivity of glass, a considerable time elapses between the time the patient receives the thermometer and an accurate reading is taken. Commonly, such time is of the order of two minutes or more. After reading, the mercury in this type of thermometer must be returned to a position of lower temperature before subsequent use thereof can be made, since the capillary size bore receiving the mercury is too small to permit ready return of the mercury merely as a result of thermal contraction. Any thermometer which is not shaken down properly may be the subject of a subsequent inaccurate reading.

Another drawback which is common to the use of mercury thermometers is the risk of spreading infection or cross-contamination among patients. Consequently, reusable thermometers ordinarily are required to undergo extensive sterilization procedures before each use. As a result of the inconvenience and occasional health hazards caused by such procedures, or by failure to execute them, throw-away type thermometers have achieved a certain amount of currency. This approach to the problem of reliable, safe temperature measurement has some advantages, but is costly and wasteful.

In some cases, it has been proposed to provide sheaths or coverings for clinical thermometers to decrease the risk of cross-infection or contamination among patients, with an object of enclosing the thermometer in a removable, impermeable sheath or cover which is placed over the thermometer and removed or discarded after use. While this approach has certain theoretical advantages, sterilization of packages containing sheaths has proven problematical, and the package has often proved unwieldy; moreover, many devices proposed for this use act as thermal barriers and consequently increase the length of time required between thermometer insertion and the time an accurate reading may be taken.

As a consequence of the foregoing, various attempts have been made to provide an electrically powered thermometer which would be capable of repeated use and which would utilize a probe and a proximate and remote display for indicating the temperature of the patient. In the past, certain thermometers constructed and proposed for this type of use have been characterized by the requirement of a relatively constant voltage supply and such units are therefore usually adapted to be energized by being plugged into a wall receptacle or the like. In other cases, where portability is desired or required, battery power has been relied upon. However, most if not all prior art units have been dependent for the accuracy of their operations upon the voltage of the energy supply, with the result that their service life in use has been relatively short because loss of battery voltage tends to result in readings of decreased accuracy.

In other attempts to manufacture clinical thermometers, inaccuracies and disadvantages have resulted from a number of other features of construction, including but not limited to the drawbacks and disadvantages set forth above and others referred to elsewhere herein.

Referring now to certain other of these drawbacks, certain prior art clinical thermometers, either proposed or actually made, have utilized display devices which were difficult to read, or which required interpolation, or which would not display a temperature reading after the temperature sensing unit was removed from the patient. Accordingly, such units often lacked the accuracy required for clinical purposes, and were difficult or impossible to use under conditions where thermometers could not be read in the vicinity of the patient. Thus, for example, under conditions of poor lighting it is often desirable for a nurse or other attendant to obtain an indication of a temperature in a darkened room or ward, but to read this temperature in some other area. This capability of maintaining the display of a reading was absent from other prior art units.

Another drawback inherently associated with a number of prior art temperature display type thermometers has been the consumption of excess current in use. Thus, although small by absolute standards, current consumption is sometimes relatively high in thermometers using display devices which include light-emitting diodes or similar display devices. Consequently, the number of determinations which can be made with such units is sharply reduced in relation to the number of readings which such units might be able to make if they utilized other display means.

In another proposed form of clinical thermometer using a separate power supply and an individual probe for temperature sensing, the time which elapsed between temperature display and initial sensing was determined by a simple timer mechanism. While this approach is sometimes satisfactory, it may be appreciated that the preset time must be arrived at by considering the longest time interval normally encountered in use. Such a time period is by definition too long for most cases, and is also too short in cases of extremely slow instrument or detector response. In the first instance, time is wasted since the time period is much too long, while in the second instances, accuracy is sacrificed. Examples of the latter case commonly occur where there is heat insulation, even of a transient nature, between the probe and the part of the body whose temperature is sensed, or because the sensing probe is initially characterized by a relatively low temperature. Moreover, the heat capacity of the probe, and in some cases, the sheath associated therewith, was sufficient to cause slow heating of the detector. Accordingly, in most cases, a thermometer which displays a reading only after elapse of a predetermined time is not the optimum solution for a clinical thermometer.

Certain prior art thermometers of the general type referred to herein have been characterized by temperature detecting elements which require a cold junction resistance for comparison purposes. Units of this kind are often characterized by the requirement that temperature at the cold or reference junction be accurately controlled; units of this type are often sufficiently voltage sensitive to lack the accuracy required for clinical work.

When the foregoing are considered in light of the fact that much medical care today is carried out on a mass basis with a patient being visited by a succession of physicians, nurses, and other clinical or hospital personnel, the importance of accurate temperature determination is greatly emphasized, since a great number of medical measures are administered largely on the basis of the temperature of the patient, and because there may not be frequent communication between staff members and specialists.

Accordingly, there has been a need for a clinical thermometer which is reasonably economical, which is highly reliable in use, which presents a greatly reduced hazard of contamination between patients, which is readily portable, which does not require accurately fixed voltages for accurate operation, which may be used for an extremely large number of determinations before service is necessary, which has a probe unit of low heat capacity, and which preferably has associated therewith means for feeding a succession of sanitary or sterilized sheaths or the like to the tip portion of the temperature detecting probe to maintain hygiene and to facilitate manipulation thereof so that sterility is not lost as the sheath is positioned over the tip or probe.

In view of the foregoing, it is an object of the present invention to provide an improved thermometer, particularly a thermometer for clinical use.

Another object is to provide a thermometer unit which is self-contained, readily portable, and capable of extended use between service operations.

Still another object is to provide a light weight, portable thermometer which is capable of providing a large number of readings while being energized only by one or more small batteries.

A still further object is to provide a temperature measuring and display device which includes a relatively remote display, and a sensitive probe operatively associated therewith which is adapted for easy and safe insertion into a patient.

A still further object is to provide a clinical thermometer unit having a temperature detector probe comprising a compactly arranged length of material, the resistance of which varies with temperature.

Still a further object is to provide an electrically energized thermometer, the readings of which are substantially independent of supply voltage throughout a large range of supply voltage.

A still further object is to provide a thermometer which includes means for determining the rate at which the temperature of the probe is rising, and to actuate the temperature display means when the rate of temperature increase has slowed to zero or to a predetermined level.

Still a further object is to provide a thermometer characterized by minimum current consumption in use and which consumes no current when not in use.

Still another object is to provide a clinical thermometer having a digital display for indicating the temperature being measured.

Another object of the invention is to provide a clinical thermometer which uses, as a part of the temperature display means, a so-called nematic crystal or liquid crystal display unit.

Still another object is to provide a thermometer of the foregoing type which includes an operational amplifier and a voltage controlled oscillator adapted to generate constant width output pulses at a rate indicative of the instantaneous resistance of the temperature probe.

Another object is to provide a thermometer unit in which the amplifier used for increasing the strength of the temperature-indicating signal is arranged so that its gain is substantially independent, within a wide range, of the supply voltage, whereby a gradually decreasing supply voltage will not adversely affect the accuracy of the readings taken, thereby effectively prolonging battery life.

A further object is to provide a unit wherein means are provided for counting the number of pulses emitted from an oscillator during a fixed period of time, with means being associated with said oscillator to cause the frequency thereof to depend substantially entirely on a control signal which is indicative of the instantaneous resistance of an element forming a part of the temperature probe.

Another object is to provide a clinical thermometer which includes means for counting the number of output pulses occurring within a fixed time period and indicative of temperature, and which further includes means for displaying the count of pulses only when the rate of increase of detected temperature has dropped to zero or to a predetermined rate.

A still further object is to provide a thermometer having a voltage controlled oscillator, means for controlling oscillator frequency so as to make it dependent substantially entirely on the instantaneous resistance of an element having a resistance proportional to the temperature being measured, and having means for counting oscillator output pulsations occurring in a fixed time, and, at a desired time, enabling a display to be made of the number of pulses accumulated or counted during such fixed time.

Another object is to provide a temperature measuring and display apparatus having means for converting a measured resistance to a characteristic voltage, controlling the output frequency of an oscillator with this voltage, and arranging the values of such circuit so that each increment of temperature is indicated by one output pulse from the oscillator, whereby a number may be displayed which is directly indicative of temperature.

Another object is to provide a temperature measuring and display instrument having a voltage controlled oscillator providing a series of digital pulses at a frequency dependent upon the temperature being measured, determining the number of pulses occurring in a constant time interval, and having means for storing the count of such pulses occurring in each time interval for transfer to a display unit either repeatedly or only when desired.

Another object is to provide an instrument of the foregoing type which includes automatic means for re-setting the unit after each use.

Another object is to provide a clinical thermometer wherein temperature, once displayed, will remain on display or will be "memorized" until desired to be removed from the display, whether by means of a signal supplied to the apparatus, or by taking a successive temperature determinations, or otherwise.

Another object is to provide a thermometer which is operable entirely at extremely low voltages so as to eliminate the possibility of harmful or frightening shock to the patient.

Another object is to provide a thermometer in which calibration may be checked merely by reference to the display, so that the operator need not manipulate any calibration controls, thus substantially eliminating improper calibration in use by the operator.

Another object is to provide a thermometer as set forth just above wherein calibration may be checked, if desired, before each use, merely by reference to the display unit.

A further object is to provide a thermometer having one or more of the foregoing characteristics and characterized by an accuracy of at least ±0.2° Farenheit.

A further object is to provide a temperature measuring apparatus which, while not required to be manipulated to check calibration, is nevertheless easy to calibrate if desired.

Another object is to provide a clinical thermometer which is self-contained, battery-powered and which includes a resistance bridge having one leg thereof embodied in a sensor and constructed from a material whose resistance changes with temperature, an amplifier for a signal indicative of the resistance of the sensor, an instrument analog portion for converting temperature-indicative resistance to a voltage signal used to control the number of output pulses generated by as oscillator within a given or fixed time period, means for measuring the number of pulses occurring within such fixed time period, and means for displaying, when desired, the number of pulses occurring during such period, whereby accurate temperature measurements may be made directly.

Another object is to provide a clinical thermometer unit, the operation of which is characterized by what is arbitrarily referred to as a fixed "correlation constant," that is, the unit is constructed and arranged so that the oscillator output frequency always bears a fixed relation to the resistance of the temperature-detecting resistor rather than being related to a signal whose strength depends on the supply voltage of the system. Such feature may also be thought of as means for insuring that the "overall system gain" (as explained elsewhere herein) is independent of supply voltage.

A further object is to provide a clinical thermometer using what is herein referred to as a "window" generator which includes a FLIP/FLOP element triggered or "clocked" by a multivibrator having an accurately controlled full-cycle frequency, whereby the "window" duration which is used in counting oscillator output pulses is of a correspondingly accurate duration.

Another object is to provide a clinical thermometer which, while ordinarily adapted to display a temperature reading only after the rate of temperature increase slows or stops, is also readily adapted to provide a rapid, continuing sequence of individual readings for substantially continuous temperature monitoring.

Another object is to provide a thermometer ordinarily capable of displaying a patient's temperature within narrow limits of accuracy in about 15 seconds or less.

Still a further object is to provide a novel probe cover for use as a clinical thermometer.

Another object is to provide a clinical thermometer probe cover dispenser having a number of advantages and characteristics not found in the prior art.

Another object is to provide a temperature measuring instrument characterized by a novel temperature detecting element.

Another object is to provide a thermometer having a temperature detecting probe which is highly sensitive to temperature differences and which has relatively great resistance so as to minimize power consumption in use.

A still further object is to provide a temperature probe with such a clinical thermometer wherein the probe is characterized by relatively low heat capacity and excellent properties of thermal conductivity.

The foregoing and other objects and advantages are accomplished by providing a clinical thermometer having means for placement in association with a patient whose temperature is to be measured, means for producing a control voltage indicative of this temperature, means for creating, within a predetermined, fixed time, a number of discrete pulses indicative of the control voltage, means for counting the number of pulses occurring within this time, and means for displaying, when desired, the number of pulses counted within such time period, whereby the temperature of the patient may be read directly from the instrument.

The invention also accomplishes its objects by providing a portable clinical thermometer using novel electronic circuitry for the foregoing purposes, as well as by providing means for repeatedly sheathing the temperature detecting probe of the instrument in a succession of individual sheath units adapted for disposition after use and maintenance of a sanitary condition before use.

The manner in which the foregoing and other objects and advantages of the invention are achieved and practiced will become more clearly apparent when reference is made to the following detailed description of the preferred embodiments of the invention and when reference is made to the accompanying drawings in which reference numerals indicate corresponding parts throughout.

Although the invention may be embodied in a number of different forms of apparatus, and although the invention is capable of diverse uses in various environments, a preferred form thereof will be described with respect to an embodiment wherein the temperature measuring or detector probe includes a resistance element forming one leg of a bridge adapted to create an analog signal, wherein circuits are provided for converting and amplifying this signal in response to temperature changes, wherein this signal is used to control the frequency of an oscillator, wherein a "window" generator is used to establish a predetermined time interval during which a number of individual pulses characteristic of the probe temperature will occur, wherein circuits are provided for counting the number of such pulses and for displaying them upon receipt of a display-enabling signal, and wherein a circuit is provided for triggering the display-enabling signal as the rate of probe temperature increase becomes or approaches zero.

In the preferred form, a circuit is provided for insuring that output frequency of the oscillator is substantially independent of supply voltage, the display system is in nematic crystal form, and the resistance bridge includes very high resistance elements for minimum current consumption.

The preferred form includes a number of other novel features which will be described in detail, a number of which, while not necessarily novel per se, provide important advantages in use.

Figure 1:
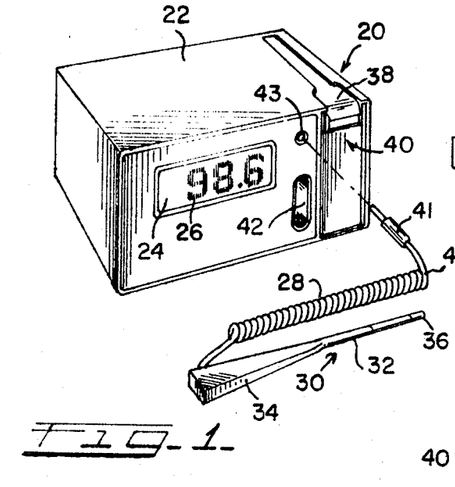
FIG. 1 is a perspective view of one form of the clinical thermometer of the invention, showing the housing, temperature display portion and the associated temperature detecting probe, and showing the unit to house a dispenser for a plurality of individual probe sheaths.
Figure 2:
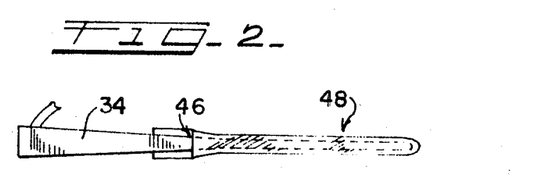
FIG. 2 is a plan view, on an enlarged scale of the temperature detecting probe, showing the probe to be covered with a sheath.

Referring now to the drawings in greater detail, FIG. 1 shows the apparatus of the invention to be embodied in a thermometer instrument generally designated 20 and shown to be contained in a housing 22 which includes display panel 24 containing a plurality of digits 26 thereon of the familiar type provided by seven-element display system to which reference will be made elsewhere herein.

As shown, a cord 28 connects the housing 22 to a temperature detecting probe 30 which in turn includes a shank portion 32, a handle portion 34 and a tip 36 adapted to receive a temperature sensing element to which reference will be made elsewhere. In the preferred form shown in FIG. 1, a removable dispenser unit 40 contains a number of the cover assemblies 38 and is adapted to feed them from a storage position onto the shank portion 32 of the probe 30 in a manner to be described elsewhere herein.

FIG. 1 also shows an opening 42 to be provided for reception and storage of the probe 30 when the same is not in use, with means (not shown in FIG. 1) preferably being associated with the receptable 42 for switching the unit off.

Referring now in general terms to the operation of the unit, it will be assumed that it is desired to take the temperature of a clinical patient and that, for this purpose, the portable unit 20 has been carried by a nurse or other person to a position adjacent the patient. Prior to placing the probe in the mouth of the patient, the nurse or other operator may, if desired, check calibration of the instrument. This is accomplished by removing the probe 30 from the housing 22 and also removing the plug 41 from the jack 43. As will be explained in greater detail elsewhere herein, removing the probe 30 activates the principal off-on switch, while removing the plug 41 from the jack 43 places a resistance of predetermined value in the bridge in place of the resistance provided by the line cord 28 and the resistance within the tip 36 of the probe 30.

In this condition, the bridge contains four known resistances, and the thermometer unit will display a reading between 98.4° and 98.8° F., indicating that the instrument is properly calibrated. If, for some reason, numbers within this range do not appear on the panel 24, the instrument is taken out of service for adjustments by maintenance personnel. While the step of checking instrument calibration may be carried out before making each individual determination, it is not ordinarily necessary to check the calibration any more often than daily, in view of the accurate performance characteristics of the instrument.

Assuming now that the instrument is within the calibration range, the operator inserts the shank portion 32 of the 30 within the opening 46 in the sheath or sleeve portion 48 of the uppermost of the cover assemblies 38, inserting the shank 32 fully within the sleeve 48. The sleeve 48 itself is formed by upper and lower portions 50, 52 of thin plastic material. After the probe 30 is fully inserted, it is moved vertically, removing the shank 32 and the entire associated cover assembly 38 vertically through the opening 54 in the upper portion of the dispenser 40. Thereupon, with the finger tab portion 56 of the cover assembly 38 held in place by the thumb or fingers of one hand, the paper backing portion 58 of the cover assembly 38 may be pulled by the fingers of the other hand substantially straight towards the rear. This causes the relatively stiff paper backing 58 to separate from the upper and lower plastic sheets 50, 52 forming the sheath 48 of the cover assembly 38. In this way, the paper backing 58 is used to provide stiffness for convenient dispensing but the paper 58 is discarded before the covered probe 30 is used. With the sleeve 48 over the shank portion 32 of the probe 30, the protected portion of the probe 30 may be placed in the patient's mouth. After a waiting period dependent upon various factors discussed elsewhere herein, but typically of the order of 15 seconds, a reading of digits 26 appears on the panel 24. This temperature reading is given directly in degrees Fahrenheit, and remains displayed or "memorized" even after the probe is removed from the patient's mouth. Unless intentionally desired otherwise, the display will remain unchanged even after the thermometer is removed, or if it is moved about to a lower temperature reading area, such as being moved about within the patient's mouth. However, in the event a significantly higher temperature is detected after initial temperature stabilization, a new reading will be displayed on the panel 24. Operation in another or continuous tracking and display mode will be referred to elsewhere herein.

Figure 7:
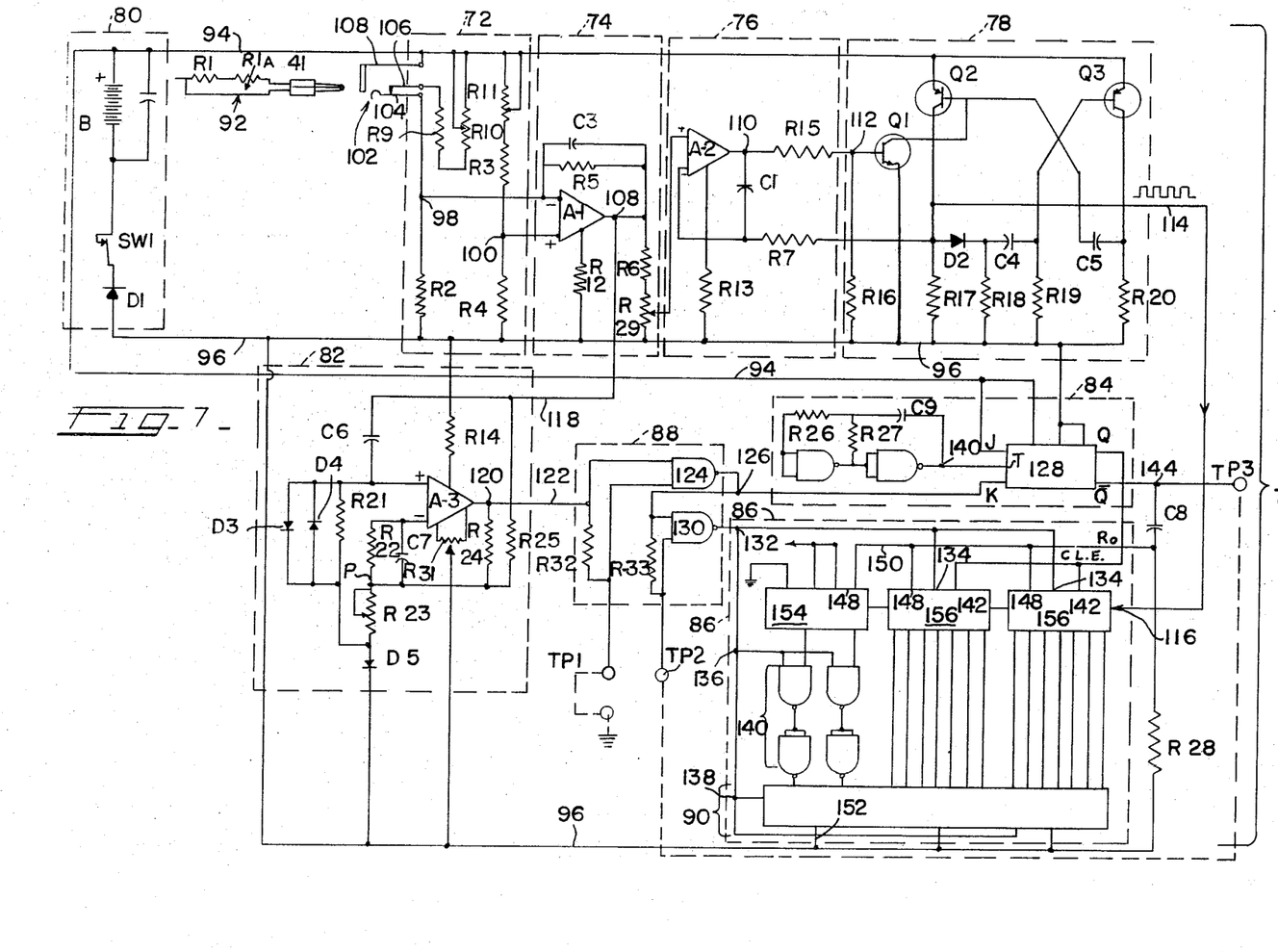
FIG. 7 is a schematic view of one form of electronic circuit which is preferred for use in accordance with the invention.

Referring now to FIG. 7, one preferred form of circuit, generally designated 70, is shown to include means for providing a number of necessary and auxiliary functions, as will now be set forth. Principal among these circuit portions are a resistance bridge circuit portion 72, a bridge signal inverting operational amplifier circuit portion 74, and integrator and voltage comparator circuit portion 76, and a voltage controlled oscillator means 78 in the form of a multivibrator having a square wave output. Additionally, a power supply portion 80 is provided, as are a differentiator and voltage comparator circuit portion 82, a "window" generator circuit portion 84, a binary counter portion 86, "display-enable" circuit portion 88 and a nematic crystal digital display portion 90. Another element forming an important part of the invention is the portion 92 of the circuit which comprises a plug for connection to the probe, and which also includes therein the resistance used in the probe tip to measure temperature as well as an adjustable calibration potentiometer R 1A.

Accordingly, the resistance bridge, when connected as shown in FIG. 7, comprises a first resistor R 9, and second, third, and fourth resistors R 2, R 3 and R 4. In series with resistor R 9 is a small adjustable resistor R 10, while resistor R 3 also has in series therewith a potentiometer or adjustable resistor R 11. Positive-polarity unidirectional current from line 94 is supplied to one terminal each of resistors R 9 and R 3, and returned to negative polarity line 96 from the opposite terminals of resistors R 2 and R 4. The voltage appearing across the center of the bridge, at points 98 and 100 is supplied, respectively as shown, to the inverting and non-inverting terminals, respectively of the operational amplifier A 1.

As also shown in FIG. 7, a jack 102 is provided, whereby upon insertion of the plug 41 (FIG. 1) spring contact 104 is moved to an out-of-contact position with respect to contact 106, thereby opening the current path from line 94 through resistors R 9 and R 10 to point 98 and instead placing resistance R 1 in the current path between the line 94 and the point 98, which, in turn includes conductor 108 and contact 104. Thus, the plug and jack, which are of a well known type, bypass the calibration resistors R 9 and R 10 and place the temperature-detecting resistor R 1 in the bridge circuit 72.

Referring again to the inverting amplifier portion 74 of the circuit 70, it will be noted that, as is customary, a feedback network comprising the parallel combination of capacitor C 3 and resistor R 5 are provided between the output terminal 108 of the amplifier A 1 and the inverting input terminal thereof. Resistor R 6 and a portion of adjustable resistor R 29 form a voltage divider between the output terminal 108 of the operational amplifier A 1 and the non-inverting input terminal of the operational amplifier A 2, which is also used as a voltage comparator in circuit 76. As shown, capacitor C 1 and resistor R 7 form an RC time-constant circuit connected to the inverting input terminal of the amplifier A 2, while the output terminal 110 of the amplifier A 2 supplies a signal indicative of temperature through resistor R 15 to the base terminal 112 of the transistor Q 1.

Referring now to the voltage controlled oscillator circuit portion 78, it will be noted that a pair of transistors Q 2 and Q 3 are arranged as a multivibrator, with their emitter terminals connected to the common power supply line 94, with the base terminal of transistor Q 2 connected through capacitor C 5 to the collector of transistor Q 3, and with the base of transistor Q 3 connected through capacitor C 4 and diode D 2 to the collector of transistor Q 2. As shown, the transistor Q 1 is connected parallel to capacitor C 5, with its collector connected to the base of transistor Q 2 and its emitter connected to the return line 96, thus acting as a variable impedance in the timing circuit of the multivibrator. An output conductor 114 extends from the collector of transistor Q 2 to an input terminal 116 of the counting circuit 86. Diode D 2 and resistor R 17 act to shape or square the output pulses in line 114, while capacitor C 4 and resistor R 19 establish the width of the pulses. Resistors R 16 - R 20 are attached to the ground or return line 96 as shown.

Referring now to the differentiator and voltage comparator circuit 82, it will be noted that line 118 is adapted to translate the signal appearing at the output terminal 108 of the inverting amplifier A 1 to one terminal of capacitor C 6 and thus control the signal appearing at one input terminal of the operational amplifier A 3; resistor R 21 controls the signal fed to this terminal, thus forming, in conjunction with capacitor C 6, a differentiator circuit to which reference will be made elsewhere herein.

The positive terminal voltage at line 94 is fed through resistors R 25 and R 23 and through diode D 5 to the negative terminal line 96, thus producing a negative voltage at point P, which is fed through resistor R 22 to the other input terminal of the amplifier A 3. Potentiometer R 31 is employed to balance out the initial offset voltage of amplifier A 3. Positive feedback from the amplifier output terminal 120 to the amplifier input terminal is accomplished through resistor R 24. Resistors R 12, R 13 and R 14 set the operating currents of amplifiers A 1, A 2 and A 3, respectively. Line 122 feeds NAND gate 124, one terminal of which is fed directly and the other through resistor R 32. The output terminal 126 of gate 124 is coupled to the K terminal of the JK flip/flop 128, and also to one input terminal of a two input second NAND gate 130. The other terminal of gate 130 is fed the same signal through a circuit which includes resistor R 33.

An output signal appearing at terminal 132 of NAND gate 130 is fed to the "display-enable" terminals 134 of the counters in the counting circuit 86, and also to terminals 136, 138 which supply respectively the four signal inverter gates 140 and the display panel 90.

Still referring to FIG. 7, it will be noted that the "window" generator circuit portion 84 includes a pair of NAND gates arranged as a highly accurate, free-running multivibrator which is shown to include resistors R 26 and R 27 and capacitor C 9, and further to include a JK flip/flop 128 adapted to receive a clock pulse or signal at the toggle terminal T from the multivibrator. This serves to control the pulse counting operation by producing characteristic output signals at the Q and $\bar{Q}$ output terminals of the flip/flop 128. Although this feature will be discussed in detail later, it will be noted that the J input terminal of the flip/flop 128 is fed always from the positive polarity bus 94, while the K input terminal receives whatever signal appears at point 126, that is a positive signal or no signal. Consequently, the flip/flop is preconditioned, when receiving an appropriate (+) signal, to change output states each time it receives a negative-going pulse from the multivibrator at the T terminal thereof. Thus, the JK flip/flop, when biased this way, will act as a so-called half-counter and count negative going pulses appearing at terminal T.

As is further shown in FIG. 7, the Q output of the JK flip/flop is fed to the "count-enable" terminals 142 of the counters 156, while the other or $\bar{Q}$ terminal furnishes a signal at terminal 144, to which is connected a test point TP 3 and a capacitor C 8. The combination of capacitor C 8 and resistor R 28 serves as a differentiating circuit to create a short pulse in the $R_o$ or reset-to-zero line 150. Operation of this portion of the circuit is also detailed elsewhere herein.

Referring now to the operation of the preferred form of circuit just described, it will be assumed that the plug 41 has been placed in the instrument after calibration has been checked and that the resistor R 1 has been placed in the bridge circuit 72. Upon insertion of the end portion 36 of the probe 30 into an area of increased temperature, the resistance of resistor R 1 will begin to change in value until it reaches a fixed or equilibrium temperature. The difference in resistance between resistors R 1 and R 2 cause a voltage to appear at both terminals of amplifier A 1, and a DC signal to appear at terminal 108. Inasmuch as amplier A 1 is connected as an inverting amplifier, as the temperature increases, the output voltage of amplifier A 1 decreases.

Referring now to the integrator and voltage comparator portion of the circuit 76, the values of resistor R 7 and capacitor C 1 are arranged to provide a very long time constant in relation to the period of the oscillator 78, thus averaging the pulsating output appearing in the collector line of transistor Q 2. Accordingly, the negative or inverting input of amplifier A 2 is the average DC output voltage of the oscillator. The higher the frequency of the oscillator, the greater the DC signal fed to the inverting terminal will be. Since capacitor C 1 causes a very large amount of negative feedback, the inverting input of amplifier A 2 will attempt to stabilize at approximately the same voltage as that presented to the noninverting input of the amplifier. This is accomplished by forcing the oscillator to a frequency which will produce an average DC output equal to the voltage at the noninverting input. Accordingly, a feedback relation or control is established whereby decreasing supply voltage, which tends to produce a decreased pulse height, requires a higher oscillator frequency in order to maintain the average DC output voltage at a constant level. Inasmuch as the input to the inverting amplifier A 1 tends to decrease by the same percentage that supply voltage decreases, the inverting feature of the amplifier insures that the voltage created by a characteristic temperature, when amplified and inverted, will increase by substantially exactly the same percentage that the supply voltage decreases.

Accordingly, since voltage at the noninverting input of amplifier A 2 increases, while oscillator frequency tends to decrease with a decrease in supply voltage, and since both do so in the same ratio, the oscillator frequency tends to remain constant at a setting which is a function only of bridge imbalance caused by the resistance of temperature-sensing resistor R 1.

From the foregoing, it will be appreciated that the "correlation constant" referred to above is a feature of the present invention, that is, there is a constant correlation between the resistance of the temperature-sensing resistor R 1 and the output frequency of the oscillator circuit portion 78 of the apparatus. Viewed in another light, it may be said that the "overall system gain" remains constant in use and is independent of supply voltage. In this sense, "gain" is considered not so much as a factor or degree of amplification, but rather as a translation or proportioning factor between (1) an analog quantity of one character (resistance) and (2) a digital quantity of another character (oscillator output pulses). Accordingly, there is a constant or invariable proportion or relation between temperature-related resistance and the oscillator output pulses to be counted.

Assuming now that, in use, the multivibrator is producing substantially square wave output pulses of constant width in line 114, these pulses are applied to the input terminal 116 of the counter where, under appropriate conditions, they may be counted by the action of the counter circuit 86.

As brought out elsewhere, the "clocking" multivibrator in the circuit portion 84 supplies clock pulses to the T terminal of the JK flip/flop. As long as the J input terminal is receiving its signal from line 94 and as long as a positive signal continues to be received at K (indicating that the resistance of R 1 continues to change) the edge-sensitive JK flip/flop will continue to be driven alternately to different states by each negative-going or full-cycle pulse from the multivibrator. Thus, the JK flip/flop will produce output pulses at one-half the frequency of the multivibrator clock. Assuming that each full cycle of the multivibrator, which is the cyclic frequency that is most carefully controlled, causes outputs to change at both the Q and $\bar{Q}$ terminals of the JK flip/flop, the counting circuit will be first enabled to count and then disabled from counting as the flip/flop changes outputs, with each change to the "enable" function being accompanied by a rapid, almost instantaneous, pulse in the reset-to-zero line. Accordingly, the counters are enabled to count and reset at the same time, insuring that counting starts at zero. This switching continues to occur as long as the JK flip/flop 128 remains in its bistable condition, that is, with a positive input signal at both the J and K terminals.

Referring now to the counting circuit 86, and the window generator portion 84 of the circuit, the output frequency of the JK flip/flop is about 6 hertz (cps), while the multivibrator in the oscillator circuit 78 may typically have an output frequency of from 50 to 1,000 hertz. In the example referred to above, counting occurs in the circuit 86, when the "window" is down and counting stops when the window is "up;" thus, during the negative portion of the output pulses from the flip/flop the counters are initially reset to zero and counting takes place thereafter. In the mode being described, for purposes of illustration, it will be understood that counting takes place during each negative or alternate cycle of the JK flip/flop, but that no display is made of the count which is taken.

Assuming now that as the resistance of the temperature detecting resistor R 1 changes, by reason of a temperature increase in the resistor, the frequency of the oscillator 78 gradually increases, and more pulses therefore occur and are counted within the fixed interval or window period established by the window generator 84. As pointed out above, before each group of pulses is counted, the JK flip/flop is driven from a state wherein counting does not take place to the opposite state wherein the counter is initially reset and counting occurs. Having in mind that, in one portion of the mode just described, the counters will be periodically reset but will not display, reference will now be made to the differentiating circuit 82 which enables a display of temperature to be made in the display portion 90 of the circuit 70 at the appropriate time.

In this circuit 82, the signal at terminal 108 of the inverting amplifier A 1 is applied to a large capacitor C 6 and as the strength of this signal increases, the capacitor C 6 charges, developing a voltage drop across resistor R 21 which approaches zero; this voltage is in turn applied to one input of the voltage comparator amplifier A 3. As the rate of change of this signal approaches or becomes zero, the capacitor C 6 stops charging, and the voltage applied to amplifier A 3 approaches the reference voltage applied to the other or noninverting input terminal. Only when the two inputs to the comparator amplifier A 3 become equal does the output at the comparator output terminal 120 switch from zero to the supply voltage. Accordingly, no signal will appear at the terminal 120 until capacitor C 6 is charged fully with respect to the voltage at the terminal 108. This condition only occurs when the temperature increase detected by the detecting probe has ceased, that is, when the resistance of resistor R 1 has ceased to change. When the line voltage signal referred to above appears in conductor 122, it is fed to both inputs of the NAND gate 124, and this causes an inversion or the absence of a signal at point 126, changing the state of the K input terminal of the JK flip/flop 128. With the J and K inputs at opposite polarity, succeeding clock pulses from the clocking multivibrator are no longer able to change the output of the JK flip/flop 128, and the count last received in the counter 86 remains locked therein.

At the same time, the polarity to the K terminal of the JK flip/flop is changed, the negative polarity signal appearing at point 126 is fed, both directly and through R 33 respectively, to the input terminals of the NAND gate 130, creating a positive output at point 132. This signal is fed, as through terminals 134, to the display-enable portions of the counter 156, whereupon the count therein appears on panel 90. The positive signal appearing at point 132 also appears at point 136, and accordingly, when a signal is received in the other inputs to these gates from counter 154, signal inversion will take place appropriately as indicated by the provision of gate pairs 140, causing the number 9 or 10 to appear in the portion of the display fed by the counter or flip/flop 154. In this connection, it will be observed that both the decimal place and the units place counters 156 are schematically shown to have seven lines extending to the display 90, since these counters 156 are preferably of the decoding type adapted for use as a part of a seven element display. On the other hand, since the unit 154 needs only to provide a reading of 9 or 10, means need be provided only for two output states, and a flip/flop 154 will therefore suffice for this purpose.

Assuming now that the thermometer probe is removed from the patient's mouth, the probe tip temperature, and accordingly the temperature of resistor R 1 decreases, causing a change in the voltage at the output terminal 108 of amplifier A 1. This in turn causes discharge of capacitor C 6. During this discharge, negative voltage developed across resistor R 21 is limited by the forward drop of diode D 4. Inasmuch as the amplifier A 3 associated with the comparator amplifier A 3 cannot produce a negative output, but can only produce either a positive output or no output, the amplifier remains latched in a condition wherein a positive signal is present at 120. During this time, the signal locked in the counters 154, 156 will continue to be displayed in the unit 90 where the temperature may be read on the panel 24 at the front of the instrument 20.

From the foregoing description, it will be realized that the display will continue to be presented until some intentional resetting act takes place, or until capacitor C 6 again begins to be charged. Thus, in the ordinary case, after the probe 30 is removed from the mouth of the patient temperature in the tip 36 drops very rapidly, beginning to approach room or ambient temperature. Because of the just-described directional characteristics of the differentiating circuit and the amplifier A 3 forming a part thereof, the highest temperature previously reached remains locked in the display regardless of any lower temperature subsequently detected by the instrument. However, assuming that the detected temperature again starts to rise, whether by reason of movement of the probe 30 within the patient or by undertaking a new reading on a different patient, the voltage change at terminal 108 of amplifier A 1 will cause capacitor C 6 to begin charging, and this condition will cause disappearance of the positive signal from output terminal 120 of amplifier A 3, causing terminal 126 to go positive, and, under these conditions, with the positive signal appearing at the K input terminal of the JK flip/flop 128, pulse counting will again take place as clock pulses are supplied to the T terminal of the JK flip/flop.

When this temperature increase rate has stopped, the output condition of amplifier A 3 will again switch, thereby changing the condition of the JK flip/flop and locking in and displaying a count of the pulse received from the voltage controlled oscillator 78. Of course, opening switch SW 1 or removing the battery B would remove all voltages and the device could be reset in this manner if there were some reason to do so.

The above described mode of operation, while not the only mode able to be undergone by the unit, is particularly advantageous in that (1) a reading is not displayed until maximum temperature is reached; (2) a reading is displayed immediately upon reaching such temperature; and (3) lower temperatures occurring after this time do not cause resetting of the instrument. On the other hand, the instrument is reset and a new reading will be displayed as either higher temperatures are detected in the same patient or as the temperature in the probe tip 36 begins to increase, whether or not it has in the meantime decreased from any previous higher level.

As pointed out above, the use of the differentiating circuit to enable the display to be made only when temperature stabilization has occurred is one important feature of the invention, and one which is believed to be novel. However, the instrument will operate to detect and display temperatures with accuracy if some form of timer or other switch or like control is substituted for this circuit. The multivibrator of the type shown at 84 is preferred for generating window pulses, but this feature might also be provided by an equivalent device. From a practical standpoint, the provision of the feedback circuit which reduces or eliminates dependance on a stable supply voltage is an important feature of the invention, but this feature might not prove necessary and such would be the case if other suitable means were provided for insuring that the voltage supply would remain stable. Certain other features of the invention, such as the gate packages, might also be replaced by other known circuits, depending on the desires of the user.

Referring now to an alternate mode of operation, phantom lines in FIG. 7 show that test point TP 1 might be grounded. In such a case, the capability of the differentiator to lock a number in the counting circuit would be eliminated and continuous tracking or monitoring of temperature could be carried out. In this mode, the differentiator is inoperative and the instrument would track continuously, both up as well as down, displaying each reading in succession. Likewise, connection might be made between test point TP 2 and TP 3, as also shown in phantom lines, and this would also bring about continuous tracking and display of the temperatures, up until the rate of change reaches zero. At this point, display will be made of the highest temperature theretofore reached.

Referring now to various features of the invention not previously discussed in detail, capacitor C 7 is provided for noise immunity, resistor R 22 establishes the bias level of the amplifier A 3, diode D 5 serves to increase the operating voltage so that the amplifier is within its linear operation range. Diode D 1 protects against damage which might result in the event the battery B is installed backwards. The diodes D 3 and D 4 establish the voltage drop across resistor R 21 of the differentiating circuit. A number of the components are shown as separated for illustration, but it will be understood that, as made available commercially, these might be the same unit. For example, the JK flip/flop 128 and the tens place counter 154 are actually a part of the same unit.

Referring now to the preferred values of the circuit components which have been found satisfactory with one form of circuit, these values are tabulated below. However, it will be understood by those skilled in the art that these values may vary considerably as is well understood by those skilled in the art, and that certain of the components for which values are given may be eliminated, or substitutions made therefor without affecting the important characteristics of the invention.

Capacitors, microfarads, except where indicated

| | | | |
|---|---|---|---|
| C 1 | .05 | C 6 | 1 |
| C 2 | 47 | C 7 | .05 |
| C 3 | .05 | C 8 | .001 |
| C 4 | 500pf | C 9 | .068 |
| C 5 | .005 | | |

Capacitors, microfarads, except where indicated — Continued

Resistors, ohms

| | | | | | |
|---|---|---|---|---|---|
| R 1 | 3400 | R 13 | 10M | R 24 | 680K |
| R 2 | 3400 | R 14 | 10M | R 25 | 1.5M |
| R 3 | 100K | R 15 | 390K | R 26 | 4.7M |
| R 4 | 100K | R 16 | 100K | R 27 | 1M |
| R 5 | 75K | R 17 | 100K | R 28 | 100K |
| R 6 | .1M | R 18 | .1M | R 29 | 25K |
| R 7 | 4.7M | R 19 | 270K | R 31 | 100K |
| R 9 | 3400 | R 20 | 680K | R 32 | 1M |
| R 10 | 200 | R 21 | 4.7M | R 33 | 1M |
| R 11 | 25 | R 22 | 4.7M | | |
| R 12 | 10M | R 22 | 10K | | |

The counters 156 in the counting circuit 86 are preferably RCA CD 4026 units, which are five stage binary counters containing seven segment decoders for output. The JK flip/flop is a CD 4027 made by RCA, while the amplifiers A 1, A 2 and A 3 may be muA776 Fairchild multipurpose programmable operational amplifiers. The NAND gate units may be of 4011 type, for example. The transistor Q 1 is an NPN type and transistors Q 2 and Q 3 are PNP types. Almost any low power or signal type silicon transistors of well-known types and similar diodes are suitable for use in the circuit shown.

Referring now to the construction of the probe unit 30 itself, and more particularly, to the tip portion 36 thereof wherein temperature sensing takes place, it has been found desirable to construct the probe in a manner such that the same resembles in external appearance an ordinary thermometer, that is, it preferably possesses a shank portion 32 of several inches length and the nose or tip portion 36 is rounded, preferably hemispherical. The shank 32 is constructed of a thin wall tubing, about 0.003 inches thickness, for examples, and made from a high tensile strength material such as an austenitic stainless steel or like material. Within the tip portion 36 is disposed the actual resistor unit R 1, and this resistor is preferably made from a material having a positive coefficient of resistance change with temperature increase. One preferred material is a so-called Balco alloys that is a high nickel alloy of a type known for desirable properties, namely, a high specific resistivity with a positive temperature coefficient.

According to the invention, this resistor material is arranged in a grid laid out in a plane and disposed such that there are a plurality of individual resistive paths in series, with each leg of the resistance grid being approximately 100 microns (0.0001 inches) thick and 0.001 inches wide. The filaments are spaced apart from each other approximately 0.001 inches and the grid is bonded to a polyimide substance to provide good resistance to chemical and atmospheric attack and to provide good heat conduction properties. With this resistance unit disposed in intimate heat exchange relation to the tip portion 36 of the probe 30, and with the shank 32 being made from a material which is of very thin cross-section and accordingly a relatively poor heat conductor, the tip 36 is essentially isolated from the shank and, in view of its small mass, is ordinarily able to achieve a stabilized temperature within a matter of 15 seconds or less. While heat exchange resulting in measurable resistance change necessary to determine temperature will depend on a number of extrinsic, including physiological factors, a tip unit made as just described has functioned very satisfactorily and has not been adversely affected by tissue thermal impedance or by the thermal impedance of the probe itself and any thin cover or sheath normally associated therewith.

Inasmuch as the elements comprising the resistor R 1 are normally permanently bonded to or encapsulated within the tip 36 of the probe 30, the resistance thereof cannot be adjusted for calibration purposes. However, the resistance can usually be determined accurately enough in advance so that any minor calibration difference which is required to be made can be placed in the unit by manipulating the trimmer or small variable resistor R 1A. Accordingly, relatively rapid and economical production of original equipment and replacement tips and probes can be accomplished within the resistance tolerances necessary for accurate thermometer response, with the provision of the small adjustable resistor arm 1 A insuring that the all thermometer probes may be accurately precalibrated for use in association with any other similar instrument without the need for adjusting the instrument in any way. Thus, as long as the instrument is calibrated, a properly calibrated replacement tip used therewith will provide accurate results.

Figure 8:
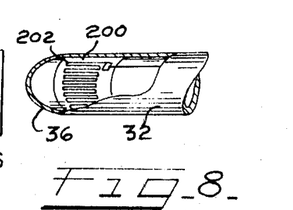
FIG. 8 is an enlarged fragmentary view of the temperature-detecting resistor and its placement in the temperature probe.

FIG. 8 shows that the grid 200 of resistance wires 202 is bonded to the inner periphery of the probe shank 32 just rearwardly of the rolled tip portion 36. Since the grid extends axially for about one-half inch, detected temperature variations are desirably averaged throughout this length, and since the grid extends through almost the entire circumference of the low heat-capacity shank 32, response is extremely rapid.

When constructed as outlined above, the resistor R 1 will normally have a resistance of about 3,500 ohms. In the preferred form of the instrument described, the electronic components making up the oscillators, amplifiers, differentiators, displays, etc., are so carefully made that 80 percent of the total energy loss in operating the instrument occurs by reason of voltage drop across the temperature sensing resistor R 1. Even under these conditions, however, it has been determined that a thermometer unit according to the present invention may be used for three months or more of continuous service when powered only by a small, 8.4 volt mercury battery. This assumes that the off-on switch SW 1 is never used and that the instrument is permitted to remain "on" at all times. If the switch SW 1 is manipulated after use of the instrument, it is normal for the instrument to be able to be used without battery replacement for up to one year without sacrifice of accuracy.

Therefore, although not necessary for use with the present invention, and therefore not specifically described in detail here, it is within the scope of present technology to use, as the resistor R 1, a lightly "doped" grid of a silicon semiconductor material. A resistor of this type, assembled in a known way might well typically have a resistance of about 70,000 ohms, and accordingly, with such reduced battery drain during operation, a thermometer otherwise identical to that described but using instead the semiconductor probe would operate continuously for about a year or intermittently for about 2 to 4 years.

Since it is a known fact that, in use, all batteries undergo loss of potential, or of the ability to furnish current, or both, it will be realized that the novel means for providing an accurate temperature reading without regard to the condition of the battery or energy supply is an extremely important feature of the invention, and a feature which might be applied to other suitable apparatus or otherwise used in analogous environments.

By way of illustrating the foregong, it may be pointed out that a clinical thermometer using a dial indicator or other analog readout mechanism rather than a digital type readout mechanism could well incorporate a response control mechanism arranged in such a way that, when supply voltage is reduced, a greater needle deflection for example, would be brought about per unit of applied voltage or current. Accordingly, the response to each increment of voltage or current would be raised as the amount of voltage or current available to operate the meter were decreased. In such a case, the meter might be of the type which would in effect act as an integrator, that is, it could give an analog-type response to receipt of a plurality of individual or digital pulses. Other equivalent means of achieving the same effect in different forms of apparatus will also be apparent to those skilled in the art.

Referring now to the provision of the differentiating circuit for presenting a reading only when the rate of increase of temperature has reached zero or has been reduced to a minimum, this feature is also useful with other forms of apparatus which might be used for the purpose of clinical thermometry or for other purposes. For example, in the event that an analog-type of temperature readout were utilized, the differentiator would be particularly useful. This is because requiring an operator to watch a needle continually until the rate of temperature increase displayed thereon reaches or approaches zero is annoying and encourages inaccuracy.

Figure 5:
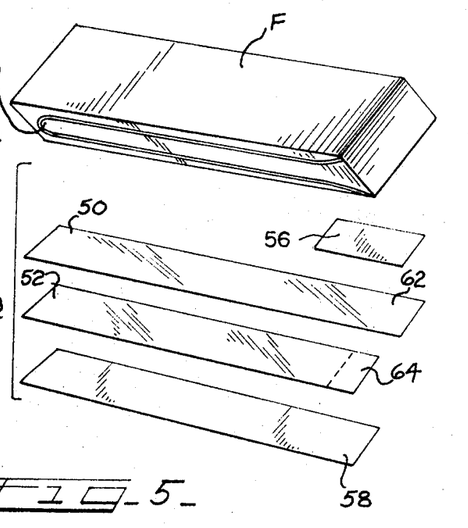
FIG. 5 is an exploded view, showing individual elements of the sheath before assembly thereof into a unitary sheath assembly.

Referring now to manufacture and use of the cover assemblies 38, one preferred method of manufacturing these units includes disposing a pair of thin polyethylene or other plastic sheets 50, 52 of a generally rectangular form such as that shown in FIG. 5 over a ppiece of somewhat stiffer backing paper 58, and thereafter placing a rectangular upper protective tab 56 of reduced length toward one end of the assembly of sheets. Thereupon, with the individual pieces lying atop one another as described, a presser foot portion F of a small press (not shown) having a downwardly extending heated die D is impressed on the stack of materials. With the die portion D being maintained at a suitable temperature by appropriate control means, downward force on the foot F will serve to bond the margins 60 of the adjacent plastic sheets 50, 52 together and also to bond the margins 60 of the plastic to the paper backing 58, while also severing the plastic outwardly of the margins from the remainder of the sheets 50, 52.

Figure 3:
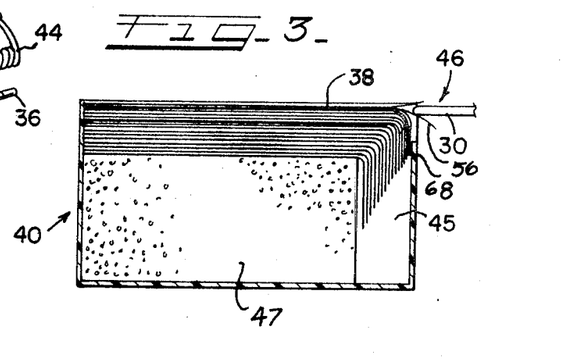
FIG. 3 is a vertical sectional view of the sheath dispenser of the invention, showing a number of sheaths received and placed therein and biased upwardly by resilient means in the form of a sponge.
Figure 4:
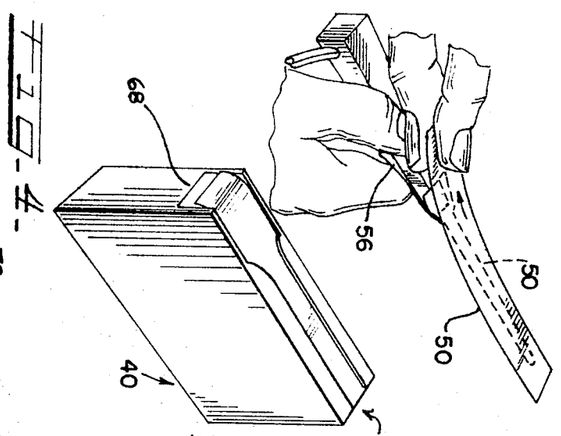
FIG. 4 is a perspective view of the sheath dispenser of the invention showing a probe disposed thereabove and illustrating removal of the stiffener from the sheath.
Figure 6:
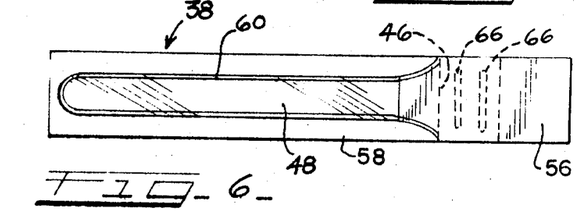
FIG. 6 is a top plan view of a preferred form of sheath made according to the invention.

This leaves a cover assembly 38 having its forward, outer margin 60 removably bonded to the backing paper 58 and with a pair of rearwardly extending flaps, one of which is the protective tab 56 permanently bonded to the end portion 62 of one plastic sheet 50, and the other of which is the end portion 64 of the sheet 52 which is removably bonded to the end portion of the paper 58, preferably at the small areas shown at 66 in FIG. 6. Accordingly, with a stack of cover assemblies 38 being disposed within the dispenser 40 shown in FIG. 3, the protective tab 56 extends past the end of paper sheet 58 and will cover counterpart ends of cover units 38 disposed therebeneath in the stack. Since the paper 58 is relatively stiff, when the tab 56 is held down by engagement thereof with the upper margin 68 of the front wall of the dispenser 40, the opening illustrated by the broken line 46 in FIGS. 5 and 6 will be readily exposed for entry of the tip 36 of the probe 30.

From the foregoing description, it will be apparent that the tab 56 serves the dual purpose of holding the cover assembly 38 when removing the paper backing 58, and also serves to cover or close off the opening 46 in the next succeeding cover assembly 38. With the foregoing arrangement, the dispenser 40, which has resilient means in the form of a sponge 47 to feed a succession of the covers 38 upward, provides a continuing supply of disposable probe covers for the thermometer probe 30. After the supply of covers 38 is exhausted, the entire dispenser 40, which may be made from plastic, metal or paper, is discarded and a new container 40 containing a new supply of covers 38 is inserted within the opening in the instrument 20. This arrangement provides easy and accurate dispensing, easy separation of paper and sheath, relatively good contamination protection, and low cost and convenience.

It will thus be seen that the present invention provides a novel thermometer unit, temperature detecting probe, dispenser arrangement and probe sheath, all of which include novel advantages and characteristics including those specifically pointed out and those which are inherent in the invention. Preferred embodiments having been described by way of example only, and it is anticipated that various modifications to the invention will occur to those skilled in the art and it is anticipated that such changes may be made without departing from the spirit of the invention or the scope of the appended claims.

We claim:

1. A portable, battery-powered clinical thermometer apparatus adapted for repeated measurement and display of the temperature of a patient, said apparatus comprising, in combination, temperature detecting means including a resistor having substantialy the same change of resistance for each unit of temperature change, control signal generating means for generating a control signal having a magnitude which is a function of the resistance of said temperature detecting means, pulse generating means for generating a plurality of discrete electrical pulses at a rate proportional to the magnitude of said control signal, means for counting the number of said pulses occurring within a predetermined time, display means for displaying the number of said pulses counted during said predetermined time, rate detecting means coupled to said control signal generating means and independent of said pulse generating means and said counting means for detecting the instantaneous rate at which the temperature measured by said temperature detecting means is changing in response only to said control signal generating means, and display control means coupled between said rate detecting means and said display means for rendering said display means operative in response to said rate detecting means only when said instantaneous rate of temperature change reaches a predetermined value, whereby the number of pulses occurring and being counted during said predetermined time bears a proportional and substantially linear relation to the resistance of said temperature response means and the number of pulses displayed indicates the true temperature of the patient.

2. An apparatus as defined in claim 1 wherein said means for generating said discrete pulses includes an oscillator having a frequency which is variable in proportion to the magnitude of said control signal, said oscillator having in the frequency-determining portion thereof a capacitor and variable resistance means in the form of a transistor having a conductivity controlled as a function of said control signal.

3. An apparatus as defined in claim 1 which additionally includes means in the form of a free-running multivibrator for establishing said predetermined time.

4. An apparatus as defined in claim 1 which additionally includes means for repeatedly establishing a constant time period, means for enabling said counting means repeatedly to initiate counting with the beginning of each of said constant time periods, whereby each pulse count accurately reflects the count of all pulses occurring during said entire time period.

5. An apparatus as defined in claim 4 wherein said means for establishing said predetermined constant time period is a multivibrator, and which further comprises a JK flip-flop coupled to said multivibrator, and wherein said rate change detecting means is coupled to the K terminal of said flip-flop, whereby, upon detection of said predetermined value of said rate of change, said flip-flop will be preconditioned to remain in one state upon occurrence of the next succeeding signal edge and whereby said count may be "locked" for display.

6. An apparatus as defined in claim 5 wherein means are provided for preventing further counting or resetting of counters when said display is enabled.

7. An apparatus as defined in claim 1 wherein said means for displaying the number of pulses counted during said predetermined time is in the form of nematic crystal display, whereby said instrument may display a reading without the energy consumption necessary to illuminate a display area.

8. An apparatus according to claim 1 wherein said temperature responsive means is in the form of a probe and wherein said resistor is disposed in intimate heat-exchange relation with the walls of said probe and arranged within said probe so as to lie along both substantial axial and circumferential portions thereof.

9. An apparatus as defined in claim 1 wherein said temperature responsive means is in the form of a probe including a semi-conductor element and characterized by a linear relation between the detected temperature change and the resistance change.

10. An apparatus as defined in claim 1 wherein there are provided, in association with said means for counting said number of pulses occurring within said predetermined time, means for resetting said counting means to zero coincidentally with the initiation of the counting operation carried on by said counting means.

11. An apparatus as defined in claim 10 wherein said means for resetting said counting means to zero includes means for feeding a reset pulse to said counter, said reset pulse being of short duration with respect to the duration of any of said pulses being counted, whereby said reset pulse does not mask any of the pulses to be counted.

12. A portable, battery-voltage supplied clinical thermometer apparatus adapted for repeated measurement and display of the temperature of a patient, said apparatus comprising, in combination, temperature detecting means including a resistor having substantially the same change of resistance for each unit of temperature change, control signal means for generating a control signal having a magnitude which is a function of the resistance of said temperature detecting means and inversely related to supply voltage by a given factor, pulse generating means responsive in frequency to a frequency control signal for generating a purality of discrete electrical pulses, said frequency control signal being a function of both supply voltage and the resistance of said temperature detecting means, means for developing a first signal having a magnitude directly proportional to said supply voltage by said given factor and said pulse frequency, means for comparing said first signal to said control signal and for providing said frequency control signal in response to the relation between said first signal and said control signal, said comparing means being arranged so that a decrease in the magnitude of said first signal causes a corresponding increase in the magnitude of said frequency control signal when that part of the magnitude of the control signal related to the temperature detecting means resistance remains constant, means for counting the number of said pulses occurring within a predetermined time, and means for displaying the number of said pulses counted during said predetermined time period, whereby the number of pulses occurring and being counted during said predetermined time period bears a proportional and substantially linear relation to the resistance of said temperature detecting means notwithstanding supply voltage variations.

13. An apparatus as defined in claim 12 which further comprises an integrating circuit coupled to the output of said pulse generating means, and wherein said first signal is formed by said integrating circiut for converting said discrete electrical pulses to a direct current signal for use in developing sid frequency control signal.

14. An apparatus as defined in claim 12 wherein said pulse generating means is a variable frequency oscillator.

15. An apparatus as defined in claim 14 wherein said oscillator includes a frequency control comprising a transistor and capacitor forming a part of the oscillator time constant circiut, said transistor being arranged as an impedance, and said impedance being controlled by a feedback relation between the oscillator output and the transistor base.

* * * * *